United States Patent
Gabor et al.

(10) Patent No.: US 9,630,508 B2
(45) Date of Patent: *Apr. 25, 2017

(54) SYSTEM AND METHOD FOR CONTROLLING REGENERATIVE BRAKING IN A VEHICLE

(71) Applicant: FORD GLOBAL TECHNOLOGIES, LLC, Dearborn, MI (US)

(72) Inventors: Daniel A. Gabor, Canton, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

This patent is subject to a terminal disclaimer.

(21) Appl. No.: 14/672,375

(22) Filed: Mar. 30, 2015

(65) Prior Publication Data

US 2015/0202965 A1 Jul. 23, 2015

Related U.S. Application Data

(63) Continuation-in-part of application No. 13/217,422, filed on Aug. 25, 2011, which is a continuation of
(Continued)

(51) Int. Cl.
*B60L 7/18* (2006.01)
*B60T 8/32* (2006.01)
(Continued)

(52) U.S. Cl.
CPC .... *B60L 7/18* (2013.01); *B60L 7/12* (2013.01); *B60L 7/26* (2013.01); *B60L 15/2009* (2013.01);
(Continued)

(58) Field of Classification Search
CPC .... B60L 7/18; B60L 15/20; B60L 7/26; B60T 8/32; B60W 10/08; B60W 10/188; B60W 30/18
(Continued)

(56) References Cited

U.S. PATENT DOCUMENTS 3,774,095 A 11/1973 Coccia
4,962,969 A 10/1990 Davis
(Continued)

FOREIGN PATENT DOCUMENTS

JP 11105688 A 4/1999
WO 2015028858 A1 3/2015

*Primary Examiner* — Jerrah Edwards
*Assistant Examiner* — Charles J Han
(74) *Attorney, Agent, or Firm* — David B. Kelley; Brooks Kushman P.C.

(57) ABSTRACT

A vehicle and a method for controlling regenerative braking may utilize the maximum available regenerative braking torque for some time during a braking event. As the vehicle speed and/or powertrain torque decreases, the regenerative braking torque is controlled to deviate from the maximum. The point at which the regenerative braking torque deviates from the maximum is chosen based on the level of vehicle deceleration. The regenerative braking torque is then smoothly blended out until it reaches zero. The regenerative braking torque is brought to zero when the vehicle speed is very low, thereby eliminating the inefficiencies associated with operating a motor at a very low speed.

21 Claims, 7 Drawing Sheets

Related U.S. Application Data application No. 10/708,516, filed on Mar. 9, 2004, now Pat. No. 8,066,339.

(51) Int. Cl.

| | | |
|---|---|---|
| *B60W 10/188* | (2012.01) | |
| *B60W 10/192* | (2012.01) | |
| *B60L 15/20* | (2006.01) | |
| *B60W 10/08* | (2006.01) | |
| *B60W 30/18* | (2012.01) | |
| *B60T 1/10* | (2006.01) | |
| *B60L 7/26* | (2006.01) | |
| *B60L 7/12* | (2006.01) | |

(52) U.S. Cl.
CPC ...... *B60T 1/10* (2013.01); *B60T 8/32* (2013.01); *B60W 10/08* (2013.01); *B60W 10/188* (2013.01); *B60W 30/18127* (2013.01); *B60L 2240/12* (2013.01); *B60L 2240/36* (2013.01); *B60L 2240/421* (2013.01); *B60L 2240/423* (2013.01); *B60L 2240/463* (2013.01); *B60L 2250/26* (2013.01); *B60T 2270/604* (2013.01); *B60W 2520/10* (2013.01); *B60W 2540/12* (2013.01); *B60W 2710/083* (2013.01); *B60W 2710/085* (2013.01); *Y02T 10/645* (2013.01); *Y02T 10/7275* (2013.01)

(58) Field of Classification Search
USPC .......................................................... 701/70
See application file for complete search history.

(56) References Cited

U.S. PATENT DOCUMENTS

| | | | |
|---|---|---|---|
| 5,511,859 A | 4/1996 | Kade et al. | |
| 5,615,933 A | 4/1997 | Kidston et al. | |
| 5,707,115 A | 1/1998 | Bodie et al. | |
| 5,853,229 A | 12/1998 | Willmann et al. | |
| 5,879,062 A | 3/1999 | Koga et al. | |
| 5,915,801 A | 6/1999 | Taga et al. | |
| 5,997,107 A | 12/1999 | Koga et al. | |
| 6,070,953 A | 6/2000 | Miyago | |
| 6,076,899 A | 6/2000 | Isella | |
| 6,099,089 A | 8/2000 | Schneider | |
| 6,126,251 A | 10/2000 | Yoshii et al. | |
| 6,177,773 B1 | 1/2001 | Nakano et al. | |
| 6,179,395 B1 | 1/2001 | Schneider | |
| 6,244,674 B1 | 6/2001 | Kuno et al. | |
| 6,309,031 B1 | 10/2001 | Crombez et al. | |
| 6,325,470 B1 | 12/2001 | Schneider | |
| 6,445,982 B1 | 9/2002 | Swales et al. | |
| 6,488,345 B1 | 12/2002 | Woody et al. | |
| 6,494,547 B2* | 12/2002 | Higashimura | B60T 8/00 188/156 |
| 6,508,523 B2* | 1/2003 | Yoshino | B60K 6/48 303/152 |
| 6,691,013 B1 | 2/2004 | Brown | |
| 6,811,229 B2 | 11/2004 | Soga | |
| 6,813,553 B2 | 11/2004 | Nakamura et al. | |
| 8,066,339 B2 | 11/2011 | Crombez et al. | |
| 8,112,194 B2 | 2/2012 | Buur et al. | |
| 8,886,432 B2 | 11/2014 | Fahland et al. | |
| 9,187,081 B2* | 11/2015 | Dai | B60W 10/196 |
| 9,211,871 B2 | 12/2015 | Crombez et al. | |
| 2002/0180266 A1* | 12/2002 | Hara | B60K 6/52 303/152 |
| 2003/0184152 A1 | 10/2003 | Cikanek et al. | |
| 2003/0230933 A1 | 12/2003 | Schneider et al. | |
| 2005/0200197 A1* | 9/2005 | Crombez | B60L 7/18 303/152 |
| 2011/0144880 A1 | 6/2011 | Enjolras | |
| 2011/0303498 A1 | 12/2011 | Crombez et al. | |

\* cited by examiner

SYSTEM AND METHOD FOR CONTROLLING REGENERATIVE BRAKING IN A VEHICLE

CROSS-REFERENCE TO RELATED APPLICATIONS

This application is a continuation-in-part of U.S. application Ser. No. 13/217,422 filed 25 Aug. 2011, which in turn is a continuation of U.S. application Ser. No. 10/708,516 filed 9 Mar. 2004, now U.S. Pat. No. 8,066,339, each of which is hereby incorporated herein by reference.

TECHNICAL FIELD

The present invention relates to a system and method for controlling regenerative braking in a vehicle.

BACKGROUND

Electric vehicles, hybrid electric vehicles (HEV's), and indeed any vehicle that utilizes an electric machine, such as an electric motor, may be configured to use the electric machine to provide regenerative braking to at least assist in stopping the vehicle. In addition, non-electric vehicles may also be configured to provide regenerative braking, for example, through the use of a hydraulic system. Regenerative braking provides a number of advantages over using a friction braking system exclusively. For example, the use of regenerative braking, whereby an electric motor provides negative torque to the vehicle wheels, reduces wear on the friction elements of the friction braking system. In addition, during regenerative braking, the motor can function as a generator, producing electricity that can be used immediately, or stored in a storage device, such as a battery.

Because of the advantages associated with regenerative braking, some regenerative braking control systems may attempt to apply the maximum regenerative braking torque so that overall vehicle efficiencies are maximized. It may be desirable to avoid this strategy, however, when the vehicle, and thus the motor, is operating at a very low speed. This is because although the motor is capable of producing very high torque at low speeds, it does so with poor efficiency. Therefore, the regenerative braking torque may be controlled to gradually reduce to zero at low vehicle speeds. Although this strategy may provide efficiencies, under certain conditions the vehicle operator may experience an inconsistent braking feel when the friction brakes engage. This may be true, for example, if the regenerative braking is ramped out quickly and the friction brakes takeover in a very short period of time. This may be especially true when the friction brakes are cold.

SUMMARY

Embodiments of the present invention may provide a vehicle and method for controlling regenerative braking by using different points to begin or end the regenerative braking, thereby accommodating a wide variety of vehicle conditions, such as different levels of vehicle deceleration and reduced-capability friction braking. This may provide advantages over vehicles and methods for controlling regenerative braking based on a single set point that is not responsive to different vehicle conditions.

Embodiments of the invention may also provide a method for controlling regenerative braking in a vehicle having a regenerative braking system. The method may include determining a first vehicle condition when the vehicle is braking. A second vehicle condition may also be determined, and the regenerative braking torque reduced to zero. The reduction in braking torque may begin when the second vehicle condition reaches a first predetermined value. The first predetermined value may be based on the first vehicle condition.

Embodiments of the invention may further provide a method for controlling a vehicle having a regenerative braking system. The method may include determining when a vehicle operator commands vehicle braking. At least regenerative braking may be used to reduce a speed of the vehicle when the operator commands vehicle braking. A first vehicle condition may be determined when the vehicle is braking. A second vehicle condition may be determined, and regenerative braking torque reduced, when the second vehicle condition reaches a first predetermined value. The first predetermined value may be based on the first vehicle condition.

Embodiments of the invention may also provide a vehicle including an electric machine operable to provide regenerative braking for the vehicle. At least one sensor may be configured to detect a corresponding vehicle condition, and to output at least one signal related to each corresponding detected vehicle condition. A controller may be in communication with the electric machine and the at least one sensor. The controller may be configured to determine first and second vehicle conditions based on signals received from the at least one sensor when the vehicle is braking. The controller may be further configured to command the electric machine to reduce regenerative braking torque to zero. The reduction of regenerative braking torque may begin when the second vehicle condition reaches a first predetermined value. The first predetermined value may be based on the first vehicle condition.

Embodiments of the present invention may include a method for controlling regenerative braking in a vehicle. The method may include the step of reducing regenerative braking to zero starting at a first vehicle speed when an amount of brake energy dissipated is greater than a brake energy limit. It may also include the step of reducing regenerative braking to zero starting at a second vehicle speed greater than the first vehicle speed when the amount of brake energy dissipated is not greater than the brake energy limit.

Embodiments of the present invention may include a method for controlling regenerative braking in a vehicle that includes the steps of: reducing regenerative braking to zero beginning when a speed of the vehicle during braking reaches a first vehicle speed based on a first vehicle condition meeting at least one criterion, and reducing regenerative braking to zero beginning when the speed of the vehicle during braking reaches a second vehicle speed greater than the first vehicle speed based on the first vehicle condition not meeting the at least one criterion.

Embodiments of the present invention may include a system for controlling regenerative braking in a vehicle. The system may include a control system including at least one controller configured to increase a speed of the vehicle at which regenerative braking begins to be reduced to zero when an amount of brake energy dissipated is no greater than a brake energy limit based on at least a temperature of a brake system of the vehicle and a status of an ignition system of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
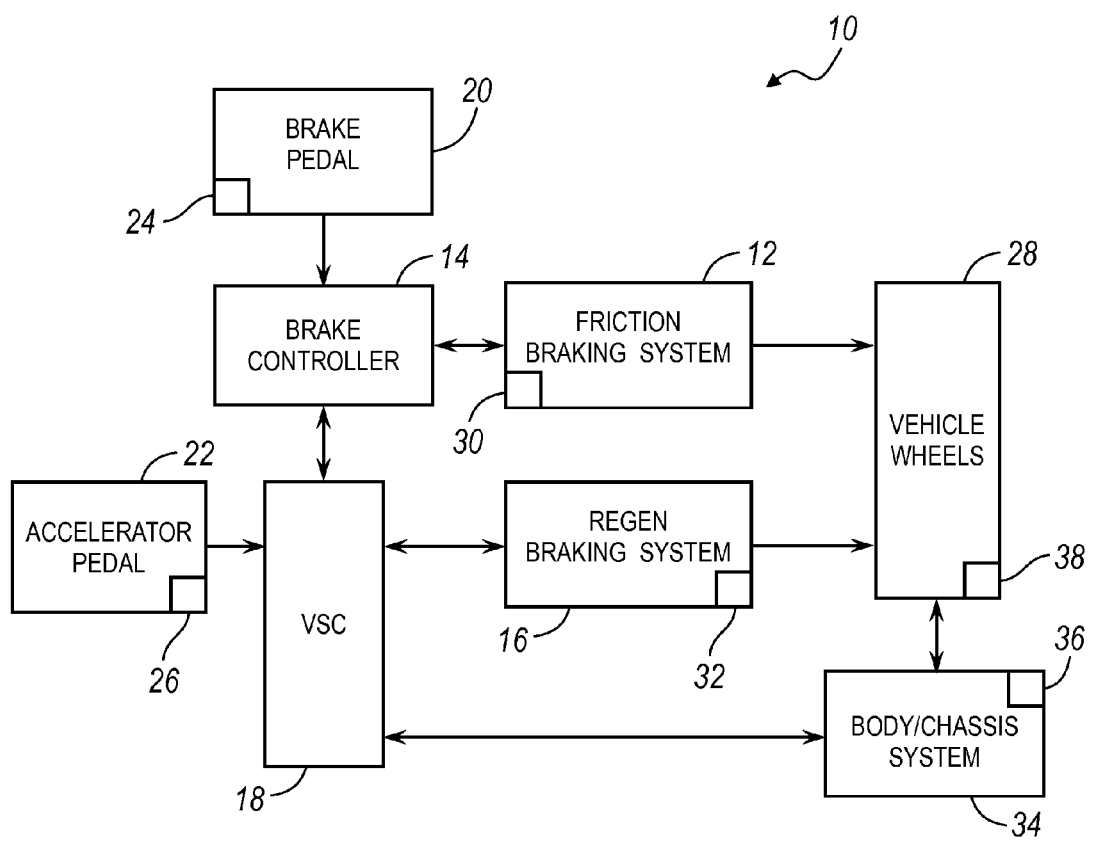
FIG. 1 shows a simplified schematic diagram of a vehicle in accordance with at least some embodiments of the present invention.

FIG. 1 shows a simplified schematic diagram of a portion of a vehicle 10 in accordance with the present invention. The vehicle 10 includes a friction braking system 12, controlled by a brake controller 14. The vehicle 10 also includes a regenerative braking system 16, which is part of the vehicle powertrain. In particular, the regenerative braking system 16 includes one or more electric machines, such as electric motors, which are operable to provide regenerative braking for the vehicle 10. The regenerative braking system 16 is controlled by a control system made up of one or more controllers, such as a vehicle system controller (VSC) 18. The VSC 18 may include other controllers, such as a powertrain control module (PCM). In fact, the brake controller 14, shown in FIG. 1 as a separate controller, may be integrated into the VSC 18, or may communicate with the VSC 18, a PCM and other controllers via a controller area network or other communication system. Thus, the various systems within the vehicle 10, including the regenerative braking system 16 and the friction braking system 12, can be controlled by a single controller, separate software controllers within a single hardware device, or a combination of separate software and hardware controllers.

The brake controller 14 receives vehicle operator inputs from a brake pedal 20, and the VSC 18 receives operator inputs from an accelerator pedal 22. In particular, a brake sensor 24 (which can be more than one sensor), is configured to detect the position of the brake pedal 20, and send one or more signals to the brake controller 14. Similarly, an accelerator pedal sensor 26 (which can also be more than one sensor), is configured to detect the position of the accelerator pedal 22, and send one or more signals to the VSC 18. The VSC 18 and the brake controller 14 use various inputs, including the inputs from the sensors 24, 26, to decide how to control the friction braking system 12 and the regenerative braking system 16. The friction braking system 12 operates to slow the speed of vehicle wheels 28 through the application of one or more friction elements in accordance with methods well known in the art. Similarly, the regenerative braking system 16 is operable to reduce the speed of the vehicle wheels 28 by having at least one electric motor produce a negative torque which is transferred through the powertrain to the vehicle wheels 28.

The friction braking system 12 includes one or more sensors, represented in FIG. 1 by a single sensor 30. The sensor 30 is configured to send signals to the brake controller 14 related to various conditions within the friction braking system 12. For example, if the friction braking system 12 should experience reduced braking capability, perhaps due to a loss of boost or the loss of a hydraulic circuit, the sensor 30 can communicate this condition to the brake controller 14, which in turn communicates with the VSC 18. Similarly, the regenerative braking system 16 has one or more sensors, represented in FIG. 1 by the sensor 32. The sensor 32 may detect such conditions as motor speed, motor torque, power, etc. The sensor 32 communicates directly with the VSC 18, which can use these inputs in combination with the other inputs to control the braking systems 12, 16.

The vehicle 10 also includes a body/chassis system 34. The body/chassis system 34 includes structural elements of the vehicle 10, including such things as a vehicle suspension system. The vehicle wheels 28, shown separately in FIG. 1, may be considered a part of the larger body/chassis system 34. One or more sensors, shown in FIG. 1 as a single sensor 36, are configured to detect various conditions of the body/chassis system 34, and to communicate with the VSC 18. The sensor 36 may detect such conditions as the deflection of, or the load on, various elements of the body/chassis system 34. Similarly, a sensor 38, which represents one or more sensors, is configured to detect conditions of the vehicle wheels 28, including the wheel speed. The sensor 38 is shown in FIG. 1 communicating with the larger body/chassis system 34, which in turn communicates with the VSC 18. Alternatively, the sensor 38 can be directly connected to the VSC 18.

Figure 2:
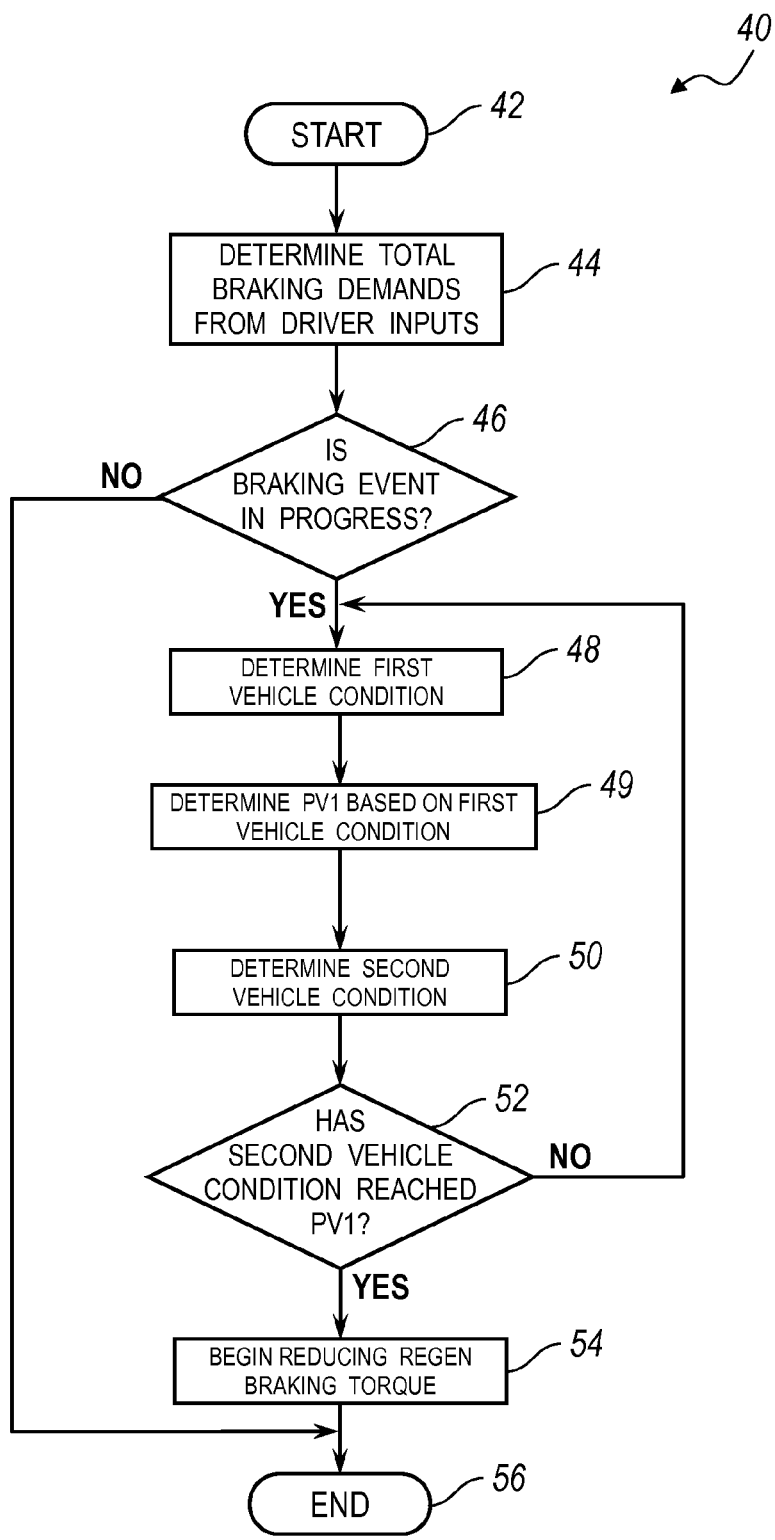
FIG. 2 shows a flowchart illustrating a method in accordance with at least some embodiments of the present invention.

FIG. 2 shows a flow chart 40 which illustrates a method in accordance with the present invention. The method begins at 42, and at step 44 the total braking demands for the vehicle 10 are determined from driver inputs. These inputs may include brake and accelerator pedal positions as detected by sensors 24, 26. The first decision is at step 46, where it is determined whether a braking event is in progress. If the inputs indicate that a braking event is not in progress, the process is ended. Conversely, if it is determined that a braking event is in progress, a first vehicle condition is determined at step 48. The first vehicle condition may be any one of a number of different vehicle conditions, such as friction brake capability, vehicle deceleration, overall braking torque—which includes both friction braking and regenerative braking—overall braking power, overall braking force, brake pedal position, suspension load, and suspension position.

At step 49, a first predetermined value (PV1) is determined. As explained in more detail below, in conjunction with FIGS. 3-7, the first predetermined value is based on the first vehicle condition, determined in step 48. Thus, the first predetermined value may be different for different vehicle conditions. This provides an advantage over systems and methods which reduce regenerative braking torque based on a single set point that is not responsive to the vehicle conditions.

At step 50, a second vehicle condition is determined, and although this occurs chronologically after steps 48 and 49 in the flow chart 40, it may in fact occur simultaneously or before either. In practice, determination of the first and second vehicle conditions may be on-going, such that the VSC 18 receives regular updates of the vehicle conditions at some predetermined frequency.

The second vehicle condition determined in step 50 can include such things as a speed of the vehicle 10, a powertrain torque, or a combination of vehicle speed and powertrain torque. The second vehicle condition is then compared to a first predetermined value at step 52. For example, if the second vehicle condition is a vehicle speed, the speed of the vehicle 10 will be monitored to determine when it has reached some predetermined speed. Because a braking event is in progress, the speed of the vehicle 10 is decreasing. Therefore, the condition in step 52 is met when the VSC 18 determines that the vehicle speed is at or below the predetermined speed. Thus, the second vehicle condition need not exactly match the first predetermined value in order for the condition at step 52 to be met.

As shown in the flow chart 40, if the second vehicle condition has not reached the first predetermined value, the method loops back to step 50, where the second vehicle condition is once again determined. If the condition at step 52 is met, the regenerative braking torque begins to be reduced at step 54. If the braking event continues, the regenerative braking torque will be reduced to zero, as described in detail below. The process is then ended, as shown in block 56, which also occurs if, at step 46, it is determined that a braking event is not in progress.

Figure 3:
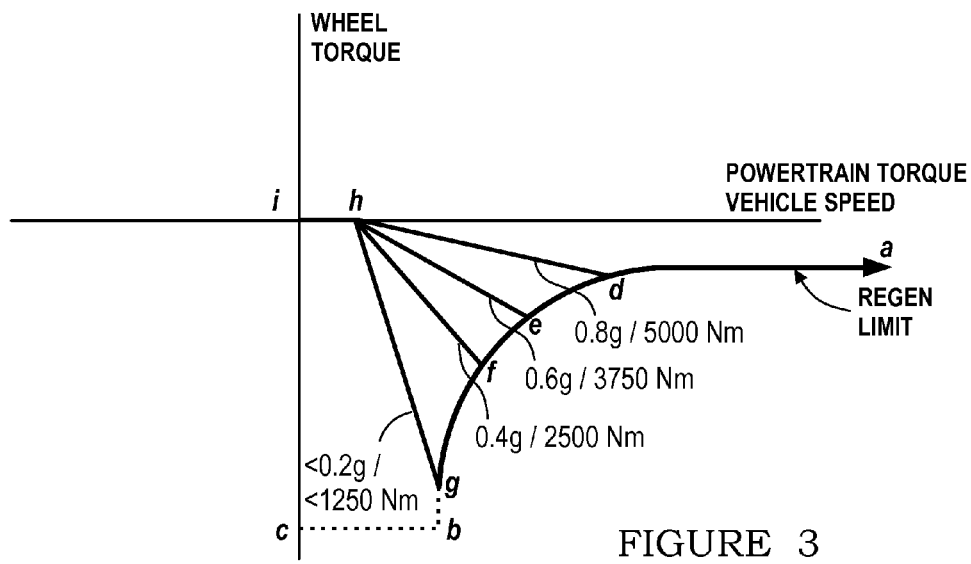
FIG. 3 shows a number of torque curves used to control regenerative braking in accordance with at least some embodiments of the present invention.

Turning to FIG. 3, the method illustrated in FIG. 2 is described in detail. Torque Curve abc represents the maximum available regenerative braking torque, or regen limit, for a vehicle, such as the vehicle 10. Because Curve abc represents braking torque, it is always negative. Therefore, as the maximum available regenerative braking torque increases, Curve abc becomes more negative.

From the graph in FIG. 3, it is clear that the amount of regenerative braking torque available increases as the vehicle speed decreases, reaching a maximum at some relatively low speed. As discussed above, operating an electric motor at very low speeds is inefficient, despite having a large amount of torque available. Therefore, regenerative braking control systems may blend out the regenerative braking torque from some value to zero, deviating from the regen limit curve, in order to reduce inefficiencies. Thus, there is a tension between the desire to use the maximum amount of regenerative braking torque available, versus the desire to reduce motor inefficiencies and provide a smooth braking experience for a vehicle operator. The present invention balances these conflicting goals by examining various vehicle conditions, and adjusting the point at which the blending of the regenerative braking torque is started—i.e., adjusting the point at which the regenerative braking torque deviates from the regen limit curve.

In addition to the regen limit curve abc, FIG. 3 also shows four additional torque curves: Curve adhi, Curve aehi, Curve afhi, and Curve aghi. The VSC 18 is configured to control the regenerative braking torque on the vehicle 10 according to torque curves similar to these. Of course, the torque curves shown in FIG. 3 represent only four possible torque curves, chosen for illustration purposes, of an infinite number of possible torque curves. Each of the torque curves in FIG. 3 corresponds to a particular first vehicle condition, such as deceleration or overall braking torque.

Specifically, Curve adhi is used when the vehicle deceleration is approximately 0.8 g, or the overall braking torque is approximately 5000 Nm. Of course, the actual braking torque is dependent on several factors, including vehicle mass; hence, the value of 5000 Nm is used here for illustrative purposes only. Similarly, Curve aehi and Curve afhi are used when the vehicle deceleration is approximately 0.6 g and 0.4 g, respectively, or the overall braking torque is approximately 3750 Nm and 2500 Nm, respectively. Curve aghi is used when the vehicle deceleration is below 0.2 g, or the overall braking torque is below 1250 Nm. For other vehicle decelerations, or other overall braking torque levels, a torque curve appropriate for the corresponding deceleration, or overall braking torque, will be used.

It is worth noting that a torque curve corresponding to a vehicle deceleration of 0.8 g does not need to be coincident with a torque curve corresponding to an overall braking torque of 5000 Nm. The same is true for the other three torque curves. The dual labels of deceleration and overall braking torque are used merely for illustrative purposes, and do not necessarily imply a coincident relationship between a particular deceleration and a particular overall braking torque value. For convenience, much of the following descriptions of FIGS. 3 and 4 refer exclusively to deceleration; however, it is understood that the same descriptions apply to overall braking torque.

Referring back to the flow chart in FIG. 2, the vehicle deceleration represents a first vehicle condition, which is determined in step 48. As described above, other vehicle conditions may be used instead of vehicle deceleration. For example, a number of torque curves could be created that would be used to control the regenerative braking based on different levels of overall braking power. Similarly, the first vehicle condition may be any one of a number of different vehicle conditions, including overall braking force, brake pedal position, suspension load, suspension position, or friction brake capability. As described above in conjunction with FIG. 1, one or more of the various sensors associated with each of the vehicle systems, can send signals to the VSC 18 to provide information about the chosen vehicle condition. The VSC 18 can then use one or more torque curves, such as those shown in FIG. 3, to control the regenerative braking of the vehicle 10.

Returning to FIG. 3, it is seen that control of the regenerative braking follows the regen limit curve for high values of powertrain torque and/or vehicle speed. At some point, control of the regenerative braking begins to deviate from the regen limit and the regenerative braking torque is blended out from some point on the regen limit curve down to zero. Each of the points at which one of the torque curves deviates from the regen limit curve—i.e., points d, e, f and g—represents the first predetermined value, used in step 52 in FIG. 2. As clearly shown in FIG. 3, the point at which the torque curve deviates from the regen limit curve—i.e., the first predetermined value—is based on the first vehicle condition, in this example, vehicle deceleration. Thus, unlike some regenerative braking control systems, the present invention uses different points to begin blending out the regenerative braking torque.

As shown in FIG. 3, the point on the torque curve at which blending begins is also the point of maximum regenerative braking torque. Because the regenerative braking torque is blended out sooner for higher levels of vehicle deceleration, there is an inverse relationship between the vehicle deceleration and the maximum regenerative braking torque. Conversely, because higher levels of vehicle deceleration are blended out sooner, there is a direct relationship between the determined deceleration value and the powertrain torque and/or vehicle speed at which blending begins.

The blending out of regenerative braking torque is shown in FIG. 3 as following a straight line, defined by two points on the torque curve. For example, Torque Curve adhi includes a first Curve Segment dh, which is defined by the maximum regenerative braking torque at Point d, and zero regenerative braking torque at Point h. The VSC 18 can determine when these points are reached, because each of these points corresponds to a vehicle condition, such as a powertrain torque or vehicle speed. Thus, for a determined deceleration of 0.8 g, the VSC 18 may control regenerative braking torque to begin blending out at a vehicle speed of 25 miles per hour (mph), and to end blending at a vehicle speed of 5 mph. Similarly, if the determined vehicle deceleration is 0.4 g, the VSC 18 may begin blending out the regenerative braking at a vehicle speed of 15 mph, while still ending it at a vehicle speed of 5 mph.

As an alternative to using vehicle speed as the second vehicle condition, the VSC 18 may also look to the powertrain torque to determine when to start blending out the regenerative braking torque. For example, if the determined deceleration is 0.8 g, and the vehicle speed is 25 mph, the VSC 18 may further look to the powertrain torque to determine whether to begin blending out the regenerative braking torque. If the powertrain torque at a vehicle speed of 25 mph is only 1,000 Nm, then the blending of regenerative braking torque may be delayed. If, however, the powertrain torque at a vehicle speed of 25 mph is 2,000 Nm, the VSC 18 may control the regenerative braking torque to begin blending.

Although the blending out of regenerative braking torque is shown in FIG. 3 as linear, it may be non-linear. For example, the blending out of the regenerative braking torque can be based on a predetermined percentage of the maximum available regenerative braking torque. In such a case, the blending would occur as a function of the regen limit curve, and would therefore, be non-linear for non-linear portions of the regen limit curve.

In the examples described in conjunction with FIG. 3, the VSC 18 controls the regenerative braking torque in accordance with a single torque curve. Because vehicle conditions change during the braking event, the VSC 18 can be configured to control regenerative braking according to more than one curve, even for a single braking event. When vehicle deceleration is used as the first vehicle condition, one method of using more than one curve to control the regenerative braking in a single braking event, involves using more than one curve only when vehicle deceleration increases during the braking event. Thus, if during the braking event, vehicle deceleration remains constant or decreases, the VSC 18 will control the regenerative braking according to a single curve, such as Curve afhi in FIG. 3. If, however, the vehicle deceleration increases from 0.4 g to 0.8 g during the braking event, the VSC 18 can begin to control the regenerative braking torque according to Curve afhi, and then finish the blending based on Curve adhi.

As shown in FIG. 3, each of the curve segments defining the blending out of regenerative breaking torque—i.e., segments dh, eh, fh, and gh—represent a change in braking torque over some change in powertrain torque and/or vehicle speed. Alternatively, because the blending out of the regenerative braking torque occurs over a period of time during a braking event, each of the curve segments dh, eh, fh and gh, can be represented by a period of time. One method by which the regenerative braking torque can be controlled for different vehicle conditions, such as different vehicle decelerations, is to use a single, constant time period over which to blend the regenerative braking torque. For example, a time period of 6 seconds may be chosen as the value over which the regenerative braking torque is to be blended out, regardless of the determined vehicle deceleration. Thus, points d, e, f and g, would be determined such that the curve segments, dh, eh, fh and gh were each completed in a time period of 6 seconds.

Figure 4:
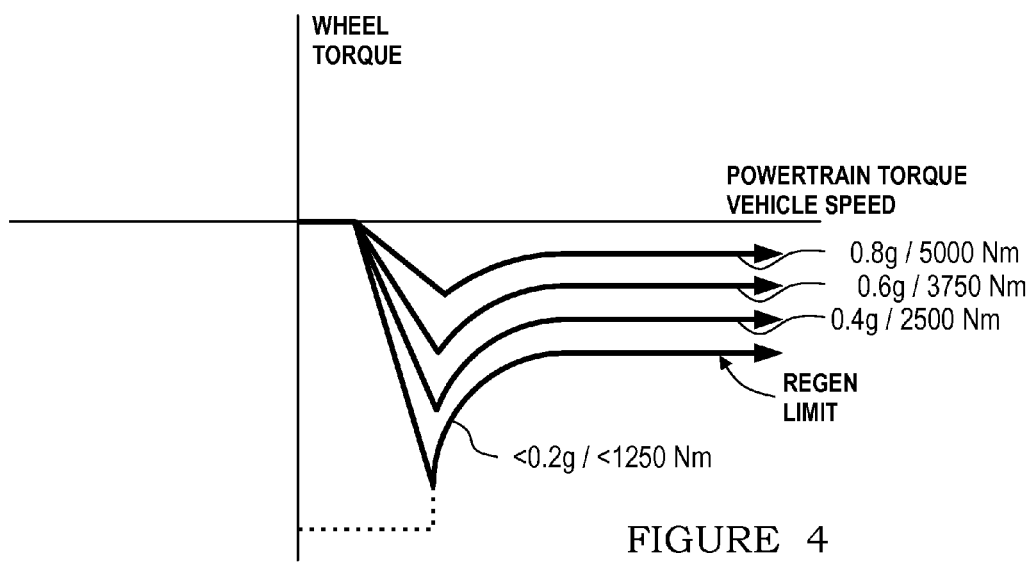
FIG. 4 shows a different group of torque curves used to control regenerative braking in accordance with at least some embodiments of the present invention.

Another way to control the blending out of the regenerative braking torque is shown in FIG. 4. In FIG. 4, only one of the torque curves follows the regen limit curve—i.e., the torque curve used for vehicle decelerations less than 0.2 g (or overall braking torques less than 1250 Nm). At higher vehicle decelerations (or overall braking torques), the entire torque curve is shifted up, such that the point at which the blending out of the regenerative torque begins, is constant, regardless of the vehicle deceleration (or overall braking torque). Although the curves shown in FIGS. 3 and 4 are based on different levels of vehicle deceleration (or overall braking torque), similar curves could be generated based on a different vehicle condition, such as the brake pedal position. The brake pedal position may be used directly, or it may be related to other vehicle conditions, such as overall braking power or overall braking force. Similarly, torque curves could be generated using different torque curves for different suspension loads and/or suspension positions.

Figure 5:
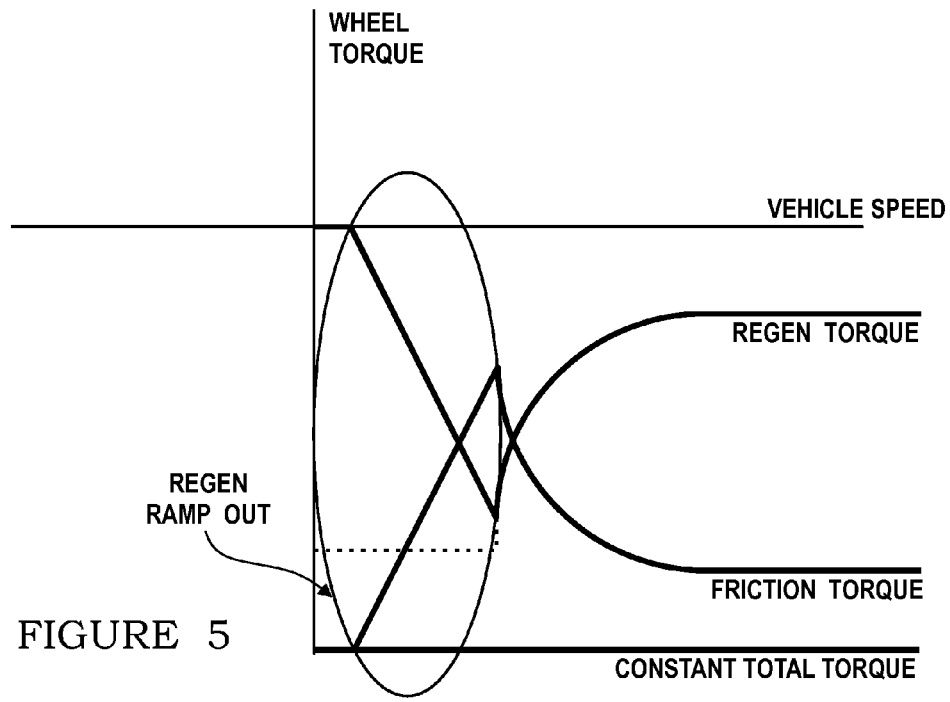
FIG. 5 shows a regenerative torque curve and a friction torque curve controlled together to create a constant total torque curve.

As described above, the first vehicle condition determined by the VSC 18 can also be a friction brake capability. FIG. 5 shows three torque curves: a regen torque curve (similar to the torque curves shown in FIGS. 3 and 4), a friction torque curve (representing a torque curve for a friction braking system, such as the friction braking system 12), and a constant total torque curve (representing the sum of the regen torque curve and the friction torque curve).

In the example shown in FIG. 5, the regenerative braking torque is controlled in a fashion similar to that described in FIGS. 3 and 4; in addition, the friction braking torque is also controlled, such that it increases to match the decreasing regenerative braking torque. This area is shown in FIG. 5 in the oval labeled "Regen Ramp Out." Matching the blending out of the regenerative braking torque with a corresponding blending in of the friction braking torque may be difficult or impossible when the friction braking capability is reduced. For example, if a friction braking system experiences of a loss of boost, or the loss of a hydraulic circuit, it may not be possible to control the friction braking torque in accordance with the curve shown in FIG. 5.

Figure 6:
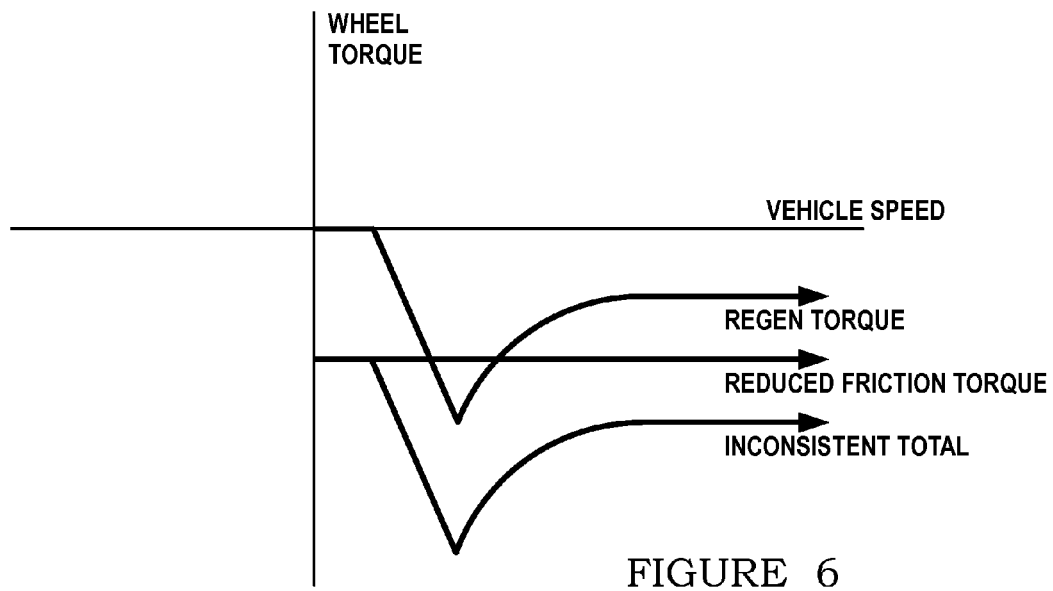
FIG. 6 shows a regenerative torque curve and a reduced capability friction torque curve, which combine to create an inconsistent total torque curve.

FIG. 6 illustrates the situation in which the regenerative braking torque follows a curve similar to that shown in FIGS. 3 and 4, but the capability of the friction braking system is reduced and no longer independently controllable. The addition of the normal regenerative braking torque and the reduced capability friction torque, produces an inconsistent total torque. Such an inconsistent total torque may require a vehicle operator to compensate, for example, by adjusting the brake pedal pressure. The present invention provides a solution to this, by blending the regenerative braking torque as described above.

Figure 7:
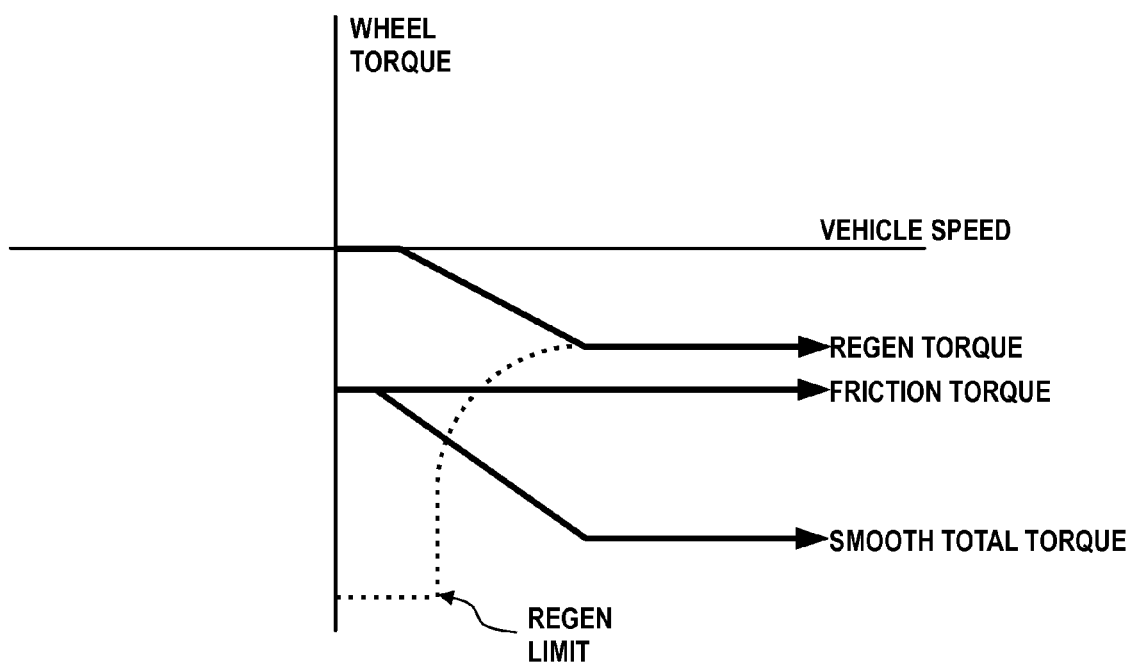
FIG. 7 shows a regenerative torque curve combined with a reduced-capability friction torque curve, resulting in a smooth total torque curve.

FIG. 7 illustrates the present invention applied to a situation where the friction braking torque capability is reduced. In this situation, the first vehicle condition, which is determined in step 48 in FIG. 2, is the friction brake capability. In this example, the second vehicle condition is the vehicle speed, indicated by the abscissa in the graph in FIG. 7. The VSC 18 can reduce the regenerative braking torque to zero, beginning at a predetermined value of the vehicle speed which is based on the reduced friction braking capability—i.e., based on the first vehicle condition.

As shown in FIG. 7, the regenerative braking torque is blended out gradually and smoothly, such that the total braking torque is also smooth, and has no abrupt changes. This provides an even, consistent feel for the vehicle operator, and eliminates the need for the vehicle operator to quickly react to compensate for a sharp change in the braking torque. For the example shown in FIG. 7, the first predetermined value—i.e., the vehicle speed at which the regenerative braking torque blending begins—may be the same for any type of reduced friction braking capability. Alternatively, the VSC 18 may be configured to use different values depending on the type and severity of the reduced friction braking capability.

Figure 8:
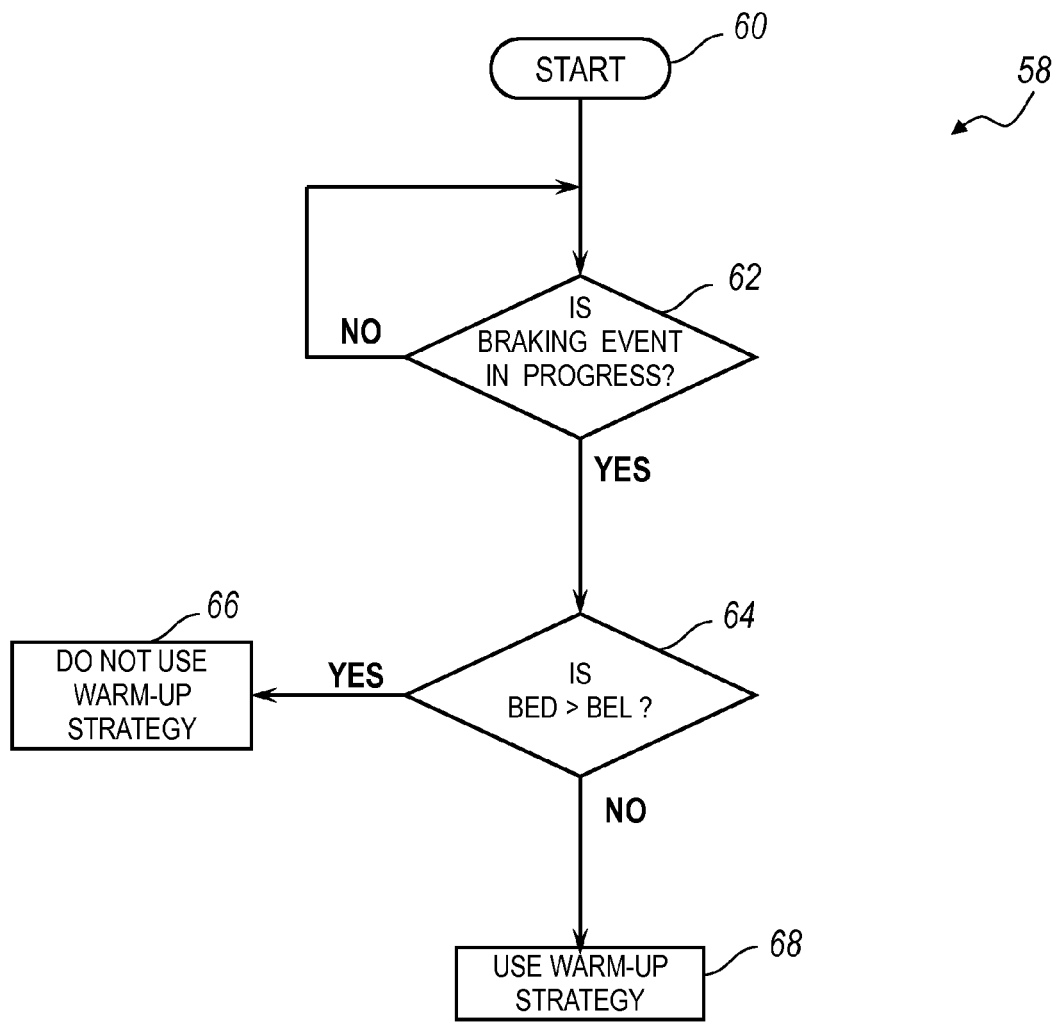
FIG. 8 shows a flowchart illustrating a method in accordance with at least some embodiments of the present invention.

As noted above, ramping out the regenerative braking quickly can lead to an inconsistent feel for the vehicle operator, particularly when the friction brakes are cold. Therefore, embodiments of the present invention employ a ramp-out strategy that considers a condition of the braking system to determine how quickly and at what speeds regenerative braking should be ramped-out. FIG. 8 shows a high-level flowchart 58 illustrating a method in accordance with embodiments of the present invention, and in particular, illustrates a decision-making process regarding whether a warm-up strategy should be used when ramping out regenerative braking.

In general, the warm-up strategy will use a higher vehicle speed than is normally used as the starting point for ramping out regenerative braking. Starting the ramp-out process at a higher vehicle speed provides a greater amount of time for the friction brakes to take over before the vehicle speed is at or near zero. By providing the additional time for the regenerative braking ramp-out and the friction braking takeover, the inconsistent feel that may be experienced by a vehicle operator when cold friction brakes are applied may be reduced or eliminated.

The method, which may be implemented by a control system such as described above, begins at step 60 and proceeds to decision block 62 where it is determined whether a braking event is in progress. If it is not, the method loops back around and continues to make the inquiry until the determination is affirmative. After step 62, the method moves on to decision block 64 where it is determined whether an amount of brake energy dissipated (BED) is greater than a brake energy limit (BEL). What the parameters "BED" and "BEL" are, and how they are determined, are described in more detail below.

If it is determined that the brake energy dissipated is greater than the brake energy limit, the method proceeds to step 66 and a warm-up strategy is not used. If, however, the brake energy dissipated is not greater than the brake energy limit then a warm-up strategy is used. In general terms, when a first vehicle condition meets at least one criterion, regenerative braking may be reduced to zero beginning when a speed of the vehicle during braking reaches a first vehicle speed. Conversely, when the first vehicle condition does not meet the at least one criterion, regenerative braking may be reduced to zero beginning when the speed of the vehicle during braking reaches a second vehicle speed greater than the first vehicle speed.

In the embodiment illustrated in FIG. 8 and described above, the first vehicle condition is the amount of brake energy dissipated, and the first vehicle condition meeting the at least one criterion occurs when the amount of brake energy dissipated is greater than the brake energy limit. More specifically, when an amount of brake energy dissipated is greater than a brake energy limit, regenerative braking may be reduced to zero starting at a first vehicle speed—e.g., the warm-up strategy is not used—and when the amount of brake energy dissipated is not greater than the brake energy limit, regenerative braking is reduced to zero starting at a second vehicle speed which is greater than the first vehicle speed—e.g., the warm-up strategy is used. The speed of the vehicle at which regenerative braking begins to be reduced to zero is increased when the BED is no greater than the BEL.

Figure 9:
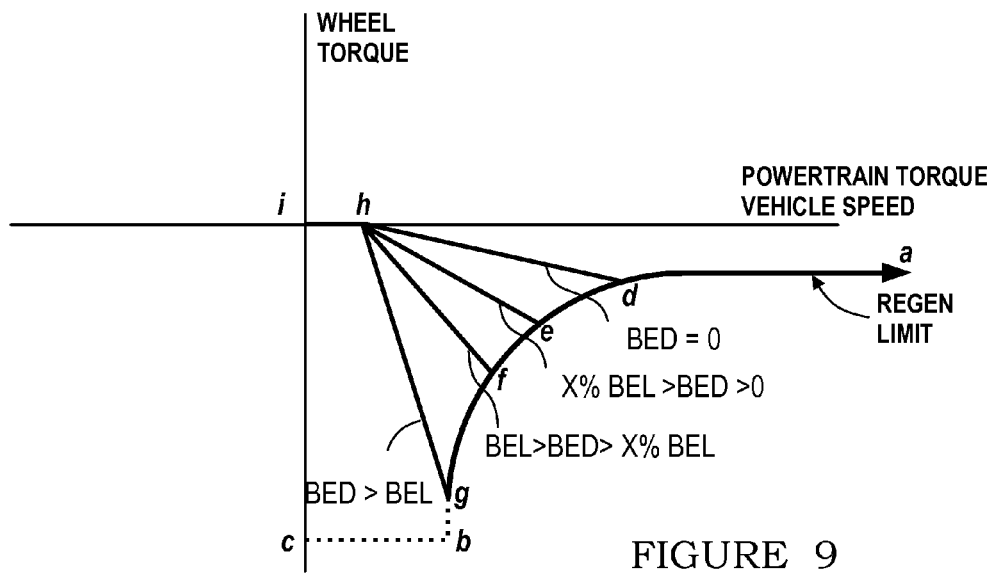
FIG. 9 shows a number of torque curves used to control regenerative braking in accordance with at least some embodiments of the present invention.

Turning to FIG. 9, the method illustrated in FIG. 8 is described in detail. Torque Curve abc represents the regen limit—see also FIG. 3 and its accompanying description. In addition to the regen limit curve, Curve abc, FIG. 9 also shows four additional torque curves: Curve adhi, Curve aehi, Curve afhi, and Curve aghi. The VSC 18 is configured to control the regenerative braking torque on the vehicle 10 according to torque curves similar to these. Of course, the torque curves shown in FIG. 9 represent only four possible torque curves, chosen for illustration purposes, of an infinite number of possible torque curves. Each of the torque curves in FIG. 9 corresponds to a particular first vehicle condition, such as the value of BED.

Specifically, Curve adhi is used when BED equals zero (BED=0). This curve shows the blending out of regenerative braking occurring starting at point (d), which is the highest vehicle speed at which blending out begins, at least in this example. Referring back to FIG. 8, and in particular decision block 64, when BED equals zero it cannot be greater than BEL, and therefore the warm-up strategy is used as shown in step 68. At the other end of the examples shown in FIG. 9 is Curve aghi, which represents the situation where BED is greater than BEL (BED>BEL). As shown in FIG. 8, the warm-up strategy would not be used in this situation. Therefore the vehicle speed at which regenerative braking begins to be blended out is represented by point (g), which may be the "first vehicle speed" referred to above.

Similarly, the vehicle speed represented by point (d) may be the "second vehicle speed" referred to above, or alternatively, point (e) or point (f) could represent this speed. This is because both points (e) and (f) represent vehicle speeds higher than the vehicle speed at point (g), and both Curve aehi and Curve afhi illustrate a control where the warm-up strategy is used. Specifically, Curve aehi is used when the value of BED is greater than zero, but less than some portion of BEL (X % BEL>BED>0). And Curve afhi is used when BED is greater than some portion of BEL, but is still less than the full value of BEL (BEL>BED>X % BEL).

Figure 10:
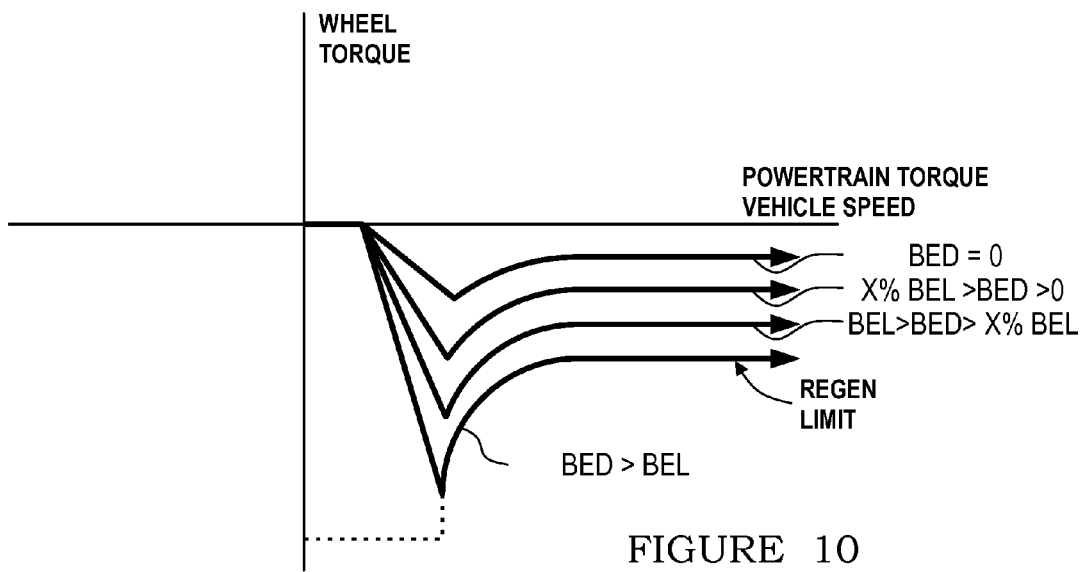
FIG. 10 shows a different group of torque curves used to control regenerative braking in accordance with at least some embodiments of the present invention.

Another way to control the blending out of the regenerative braking torque is shown in FIG. 10. Here, only one of the torque curves follows the regen limit curve—i.e., the torque curve used when BED>BEL. When BED is not greater than BEL, the entire torque curve is shifted up, such that the point at which the blending out of the regenerative torque begins, is constant, regardless of the relative value of BED. In this family of curves, the same vehicle speed is used as the point for beginning the regenerative braking torque blending out process; however, as the curves go upward from the regen limit curve, less regenerative braking is used, and therefore less blending-out needs to occur during the same reduction in vehicle speed. The top curve—where BED equals zero—is well above the regen limit, and therefore has much less blending out to accomplish during the same reduction in vehicle speed.

Although there may be different ways to calculate a brake energy limit such as described above, in at least some embodiments of the present invention, the BEL is a function of, or is based on, at least a temperature of the brake system and a status of the ignition system. Although the status of the ignition system that is used to determine the BEL may be represented by any of a number of parameters, in at least some embodiments of the present invention, the status of the ignition system includes how long the vehicle has been in a key-off state. This provides at least some indication of how cold the friction brakes may have become since the last time they were used.

As to the temperature of the brake system, this can be calculated in any of a number of different ways, including through the use of an internal temperature sensor communicating directly with a part of the control system, such as the VSC 18, where the signal can be used by one or more of the controllers connected to each other with a CAN such as described above. Alternatively, a pressure transducer or transducers may be used to estimate a temperature of the braking system for use in the calculation of the BEL. In at least some embodiments, the initial brake system temperature will be determined from data collected almost immediately after the system is enabled—e.g., within five seconds after startup.

Using the brake system temperature and the key-off time to determine the BEL may include the use of a data table correlating temperature and energy. In at least some embodiments, the temperature/energy table will have a minimum of eight data points; the temperature values may have a range of −60 C to 400 C, with a resolution of 0.01, while the energy values may have a minimum range of 0 to 250,000 Joules (J), with a resolution of 4. Such a data table may be preprogrammed into the control system and used as a lookup table based on values of the brake system temperature determined as described above. For temperature values that are between data points, a linear or other type of interpolation scheme may be used to determine the corresponding energy value.

The energy value determined from the lookup table may be used as the BEL if the key-off time has exceeded some predetermined key-off time—e.g., two hours. If the actual key-off time has not exceeded the predetermined key-off time, the BEL can be set to zero or some relatively low value so that in all or most cases the brake energy dissipated will exceed the BEL and the warm-up strategy will not be employed, or will be employed at a lower level. The value of the BEL can be further limited if desired, for example, based on brake system temperatures above a predetermined temperature. In at least some embodiments, the value of the BEL will be set to no more than 10,000 J for brake system temperatures above 20 C, regardless the energy value determined from the lookup table.

In general terms, the amount of brake energy dissipated may be a function of, or based on, a number of parameters. For example, in at least some embodiments, the amount of brake energy dissipated maybe based on at least an amount of friction torque for at least one wheel of the vehicle and a speed of the at least one wheel of the vehicle. In at least some embodiments, the BED may be further based on a prior calculation of the amount of brake energy dissipated and a time since the prior calculation. More specifically, in at least some embodiments, the BED will be initialized with a value of zero after the system is enabled. Then, the BED may be calculated by estimating the brake energy input to one or more of the vehicle wheels based on brake pressure and wheel speed. An equation for the BED in at least some embodiments may be written as follows.

$$BED(J) = BrakeEnergyDissipatedZ1(J) + FrictionTorque(Nm)*Speed(rad/s)*ControlLoopTime(s)$$

Where: BrakeEnergyDissipatedZ1(J) is the prior calculation of the BED in Joules (which is zero for the first such calculation);
Friction Torque(Nm) is friction braking torque in Newton-meters determined from the brake pressure, which may be measured by sensors on a per circuit, rather than per wheel, basis;
Speed(rad/s) is the speed in radians per second of one or more of the vehicle wheels, which may be, for example, averaged or a single wheel speed may be used; and
ControlLoopTime(s) is the elapsed time in seconds since the most recent prior determination of the BED.

As described in detail above, for example, in conjunction with FIG. 9, the point at which regenerative braking begins to be blended or ramped out to zero may vary under different vehicle conditions. This point may be chosen based on any number of factors, such as those described above, or by other factors. Embodiments of the present invention that employ the warm-up strategy described above may start with a predetermined point at which regenerative braking begins to be ramped out to zero. For example, this point may represent a particular vehicle speed such as illustrated in and described in conjunction with FIG. 9—this may be called a "maximum regenerative speed" because it is the highest vehicle speed where 100% regenerative braking and no friction braking is allowed. Thus, in embodiments using the warm-up strategy, the "first vehicle speed" described above may be the vehicle speed at which regenerative braking begins to be ramped out when the warm-up strategy is not being used—for example, point (g) in FIG. 9. The "second vehicle speed" described above may be the vehicle speed at which regenerative braking begins to be ramped out when the warm-up strategy is being used—for example, points (d), (e), or (f).

As described above, the second vehicle speed is greater than the first vehicle speed because this allows more time for the regenerative braking to be blended out and for the friction brakes to take over, thereby providing a smoother transition. In at least some embodiments, the difference between the first vehicle speed and the second vehicle speed may be a function of, or based on, at least the amount of brake energy dissipated—i.e., the BED. This speed difference may be labeled a "Warm-up Rampout Speed" (WRS), and may be defined in at least some embodiments by the following equation.

$$WRS = \max\left(0, \min\left(MWRS, MWRS * \frac{BEL - BED}{BERR}\right)\right)$$

Where:
MWRS is a predetermined, calibratable value of the maximum Warm-up Rampout Speed; in some embodiments, this may be set at 10 kilometers per hour (kph);
BEL and BED are as defined above; and
BERR is a Brake Energy Ramp Out Range, and is a predetermined, calibratable range of brake energy values suitable for ramping out the regenerative braking; in some embodiments, the range may be 5000-70,000 J with a resolution of 1 J and an initial value of 15,000 J.

From the equation above, it can be seen that when the BEL is greater than the BED—which, as described above, means that the warm-up strategy will be used—the value of WRS will be positive, and therefore the second vehicle speed will be greater than the first vehicle speed. Conversely, if the value of BED is greater than the value of BEL, then the value of WRS according to the equation will be zero, which correlates to the situation where the warm-up strategy is not used. Another relationship that can be gleaned from an analysis of the equation above is that in at least some situations, the value of WRS decreases as the value of BED increases. Therefore, in situations where the warm-up strategy is employed and the value of WRS is not zero, the difference between the first and second vehicle speeds generally decreases as the value of BED increases, while the difference in vehicle speeds generally increases as the value of BED decreases.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling regenerative braking in a vehicle, comprising:
   reducing regenerative braking to zero starting at a first vehicle speed when an amount of brake energy dissipated is greater than a brake energy limit; and
   reducing regenerative braking to zero starting at a second vehicle speed greater than the first vehicle speed when the amount of brake energy dissipated is not greater than the brake energy limit.

2. The method of claim 1, wherein a difference between the first vehicle speed and the second vehicle speed is a function of the amount of brake energy dissipated.

3. The method of claim 2, wherein the difference between the first vehicle speed and the second vehicle speed decreases as the amount of brake energy dissipated increases.

4. The method of claim 1, wherein the amount of brake energy dissipated is based on at least an amount of friction torque for at least one wheel of the vehicle and a speed of the at least one wheel of the vehicle.

5. The method of claim 4, wherein the amount of brake energy dissipated is further based on a prior calculation of the amount of brake energy dissipated, and a time since the prior calculation.

6. The method of claim 1, wherein the brake energy limit is based on at least a temperature of a brake system of the vehicle and a status of an ignition system of the vehicle.

7. The method of claim 6, wherein the status of the ignition system of the vehicle includes how long the vehicle has been in a key-off state.

8. A method for controlling regenerative braking in a vehicle, comprising:
   reducing regenerative braking to zero beginning when a speed of the vehicle during braking reaches a first vehicle speed based on a first vehicle condition meeting at least one criterion; and
   reducing regenerative braking to zero beginning when the speed of the vehicle during braking reaches a second vehicle speed greater than the first vehicle speed based on the first vehicle condition not meeting the at least one criterion.

9. The method of claim 8, wherein the first vehicle condition is an amount of brake energy dissipated, and the first vehicle condition meeting the at least one criterion occurs when the amount of brake energy dissipated is greater than a brake energy limit.

10. The method of claim 9, wherein the amount of brake energy dissipated is based on at least an amount of friction torque for at least one wheel of the vehicle and a speed of the at least one wheel of the vehicle.

11. The method of claim 10, wherein the amount of brake energy dissipated is further based on a prior calculation of the amount of brake energy dissipated, and a time since the prior calculation.

12. The method of claim 11, wherein a difference between the first vehicle speed and the second vehicle speed is a function of the amount of brake energy dissipated.

13. The method of claim 12, wherein the difference between the first vehicle speed and the second vehicle speed decreases as the amount of brake energy dissipated increases.

14. The method of claim 9, wherein the brake energy limit is based on at least a temperature of a brake system of the vehicle and a status of an ignition system of the vehicle.

15. The method of claim 14, wherein the status of the ignition system of the vehicle includes how long the vehicle has been in a key-off state.

16. A system for controlling regenerative braking in a vehicle, comprising:
    a control system including at least one controller configured to: reduce regenerative braking to zero starting at a first vehicle speed when an amount of brake energy dissipated is greater than a brake energy limit; and increase the speed of the vehicle at which regenerative braking begins to be reduced to zero when an amount of brake energy dissipated is no greater than a brake energy limit based on at least a temperature of a brake system of the vehicle.

17. The control system of claim 16, wherein the brake energy limit is further based at least in part on a status of an ignition system of the vehicle.

18. The control system of claim 17, wherein the status of the ignition system of the vehicle includes how long the vehicle has been in a key-off state.

19. The control system of claim 16, wherein the amount of brake energy dissipated is based on at least an amount of friction torque for at least one wheel of the vehicle and a speed of the at least one wheel of the vehicle.

20. The control system of claim 19, wherein the amount of brake energy dissipated is further based on a prior calculation of the amount of brake energy dissipated, and a time since the prior calculation.

21. The control system of claim 20, wherein the amount of the increase in the speed of the vehicle at which regenerative braking begins to be reduced to zero is a function of the brake energy dissipated.

* * * * *